June 30, 1970     E. S. WOODHALL     3,517,721
AXIALLY EXPANDABLE TIRE AND RIM ASSEMBLY
Filed Sept. 23, 1968     2 Sheets-Sheet 2

INVENTOR.
EDWIN S. WOODHALL
BY
ATTORNEY 3,517,721
AXIALLY EXPANDABLE TIRE AND RIM ASSEMBLY
Edwin S. Woodhall, Cuyahoga Falls, Ohio, assignor to The Goodyear Tire & Rubber Company, Akron, Ohio, a corporation of Ohio
Filed Sept. 23, 1968, Ser. No. 761,643
Int. Cl. B60c 3/00
U.S. Cl. 152—352      10 Claims

ABSTRACT OF THE DISCLOSURE

A tire and wheel assembly for a vehicle which is axially expandable and contractible to vary the tire cross-section while the tire is inflated and mounted on and supporting the vehicle so as to provide for greater flotation when necessary or desirable.

---

The foregoing abstract is not to be taken as limiting the invention of this application, and in order to understand the full nature and extent of the technical disclosure of this application, reference must be made to the accompanying drawings and the following detailed description.

This invention relates to a novel and improved tire and wheel assembly for a vehicle.

In conventional wheels for pneumatic tires the wheel is provided with a pair of spaced apart rim flanges and a respectively associated pair of tire bead seating portions by means of which the beads of a pneumatic tire may be supported on the wheel. Normally the wheel maintains the beads of the tire in a fixed predetermined spacing. Some such wheels are adapted to be disassembled for the insertion of inserts, or the like, by means of which the bead spacing may be changed. However, the bead spacing is normally not variable once the wheel has been assembled and the tire mounted thereon.

It is well known to provide high flotation tires for special service such as operation on soft earth. By flotation is meant the ability of the tire to support the vehicle on soft earth, mud, or the like without permitting undue penetration of the tire into the earth, etc. The varying of the cross-section of a given tire to provide a greater section width for the tire will tend to make available and provide a larger ground contacting portion or footprint so that the weight of the vehicle supported by the tire is spread over a larger area, thus reducing the unit loading on the supporting soil, etc. However, it may be desirable to operate the same vehicle both on a hard surface and on a softer surface. Examples of such usage might be a boat trailer or a military vehicle wherein the vehicle is normally used on a highway or hard surface road, but it is often necessary to move the vehicle over soft earth or mud with the attendant risk that the wheels will sink into the soft earth or mud.

Accordingly, it is the object of this invention to provide a novel and improved tire and wheel assembly for a vehicle which will permit the selective adjustment of the spacing of the portions of the wheel adapted to seat the beads of a tire so as to permit the spacing of the beads to be varied in a predetermined manner with the tire being capable of assuming either a relatively conventional cross-section or one in which the section width of the tire is materially increased so as to provide greater flotation.

Other objects will be in part obvious, and in part pointed out more in detail hereinafter.

Figure 1:
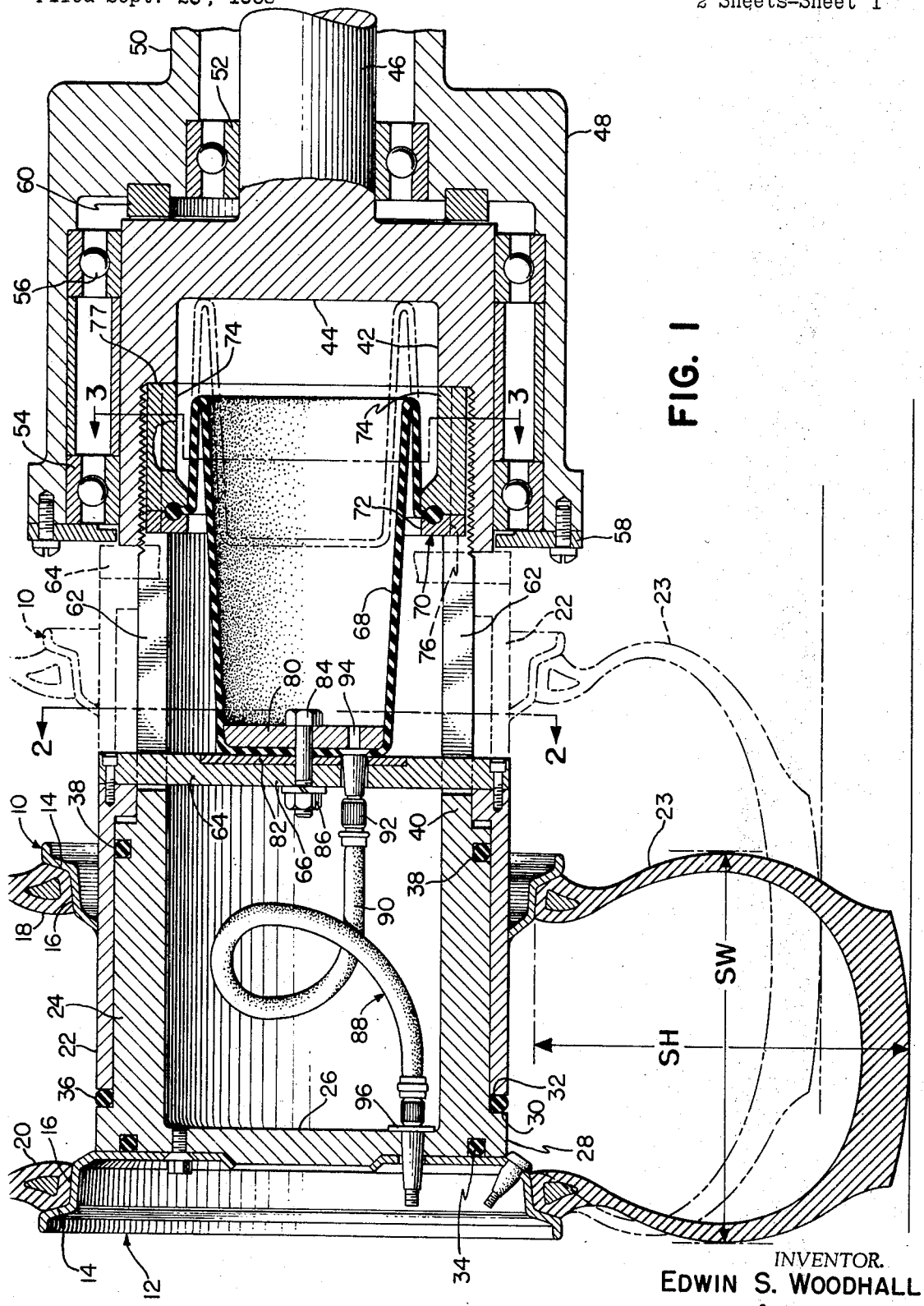
FIG. 1 is a fragmentary, longitudinal cross-sectional view of a tire and wheel assembly of the present invention.
Figure 2:
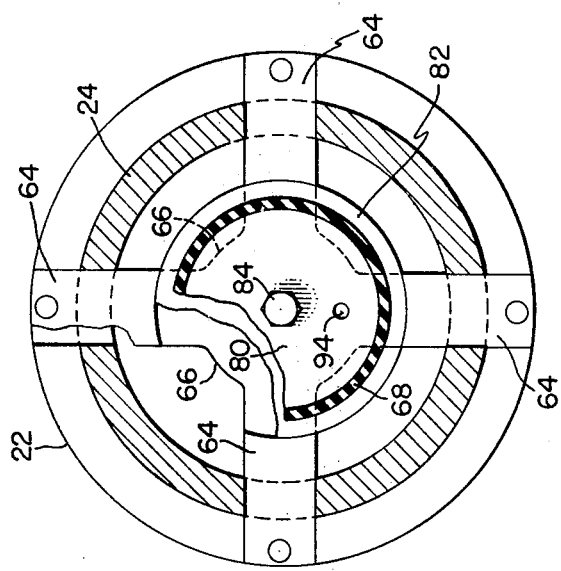
FIG. 2 is a cross-sectional view taken substantially along the line 2—2 of FIG. 1.
Figure 3:
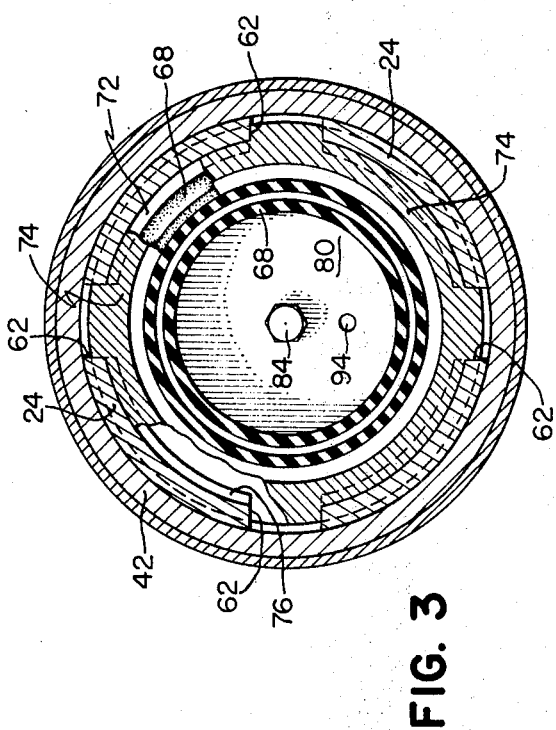
FIG. 3 is a cross-sectional view taken substantially along the line 3—3 of FIG. 1.

With reference to the drawings, and particularly FIGS. 1 through 3, a wheel assembly constructed in accordance with the present invention comprises a pair of rim members generally indicated at 10 and 12. The rim members are substantially identical and, as conventional, are allochirally arranged with each comprising a flange portion 14 and a tire bead seat portion 16. The rim portions or members 10 and 12 are, as shown in FIG. 1, adapted to support the beads 18 and 20, respectively, of a pneumatic tire 23. Where the tire 23 is of the tubeless variety, as shown, the rim members 10 and 12 form an airtight seal with the beads 18 and 20.

The rim member 10 is fixed concentrically of and on a tubular member or sleeve 22 and is disposed intermediate the ends of the sleeve. The sleeve 22 is supported by a second sleeve 24 disposed telescopically and coaxially within the sleeve 22. In the specific embodiment shown the sleeve 22 is slidably supported on the sleeve 24 so as to provide for relative coaxial movement between the rim members 10 and 12. In this connection, the rim member 12 is fixed to, by being integral with, an end wall 26 closing the outer end of the sleeve 24. The sleeve 24 is provided at its outer end with a radially outwardly extending portion or flange 28 forming an axially inwardly facing shoulder 30 which cooperates to provide a stop with respect to the axially outer end surface 32 of the outer sleeve 22 so as to limit relative movement of the sleeves 2 and 24 toward each other. Seals in the form of O-rings 34, 36 and 38 prevent loss of air from within the tire 22.

The inner sleeve 24 is provided with a reduced diameter portion 40 extending axially inwardly of the wheel assembly. The inner end of the reduced diameter portion 40 of the sleeve member 24 is externally threaded and is threadably engaged coaxially within a counterbore at the outer end of a tubular portion or skirt 42 of a cup-shaped hub member 44. The hub 44 is fixed for rotation with a rotatable axle 46. The hub 44 is received concentrically within a cup-shaped portion 48 which is fixed at and relative to the outer end of a fixed outer axle or sleeve 50 within which is received the inner axle 46. The sleeve 50 is fixed relative to and forms a part of the vehicle supported by the tire and wheel assembly. A bearing 52 supports the axle 46 concentrically of and on the axle 50 and bearings 54 and 56 rotatably support the hub 44 concentrically within the cup-shaped member 48. A retainer ring 58 fixed to the outer end of the cup-shaped portion 48 maintains the cup-shaped portion and hub in assembly. A thrust washer 60 is disposed between the inner end of the hub 44 and oppositely axially facing wall of the fixed outer axle 50.

With reference to FIGS. 1 and 2, the reduced diameter portion 40 of the inner sleeve 24 is provided with a plurality of slots extending axially thereof and spaced equiangularly about the axis of the sleeve. In the particular embodiment shown, four such slots 62 are provided. Slidably received within these slots are a plurality of keys 64 extending radially of the axis of the wheel assembly. The keys 64 are integral with and extend radially outwardly from a central portion or hub 66 disposed concentrically of the sleeve 24. The outer ends of the keys 64 are fixed to the inner end of the outer sleeve 22 for movement therewith. The keys 64 permit relative axial movement between the sleeves 22 and 24 while effectively preventing any significant relative movement between these members in a direction about the axis of the wheel assembly so as to provide a rotative driving connection between the sleeves 22, 24 and assure rotation of the same as a unit.

In order to provide for relative axial movement between the sleeves 22 and 24, and thus the rim members 10 and 12, drive means are provided for acting between the sleeves 22 and 24 to effect relative movement therebetween in at least one axial direction. In the specific embodiment of FIG. 1, the drive means comprises an expansible chamber in the form of a reinforced rubber diaphragm 68, which is anchored at its outer periphery to the inner sleeve 24, and at its center is anchored relative to the outer sleeve 22. More particularly, the diaphragm 68 is provided at its outer periphery with a bead portion. A split clamp 70 is split in a plane normal to the axis of the wheel assembly and comprises a pair of annular clamp members 72 and 74 between which the bead of the diaphragm is clamped. The annular members 72 and 74 are engaged within a counterbore 76 at the inner end of the tubular member 24, whereby the shoulder formed by the counterbore limits movement of the annular member 72 inwardly of the sleeve member 24 and serves to locate the same. The annular member 74 is engageable at one end with a shoulder 77 in the hub member 44 formed by the counterbore which threadably receives the inner end of the tubular member 24. Both the members 72 and 74 are provided with radially extending ears or lugs spaced equiangularly about the axis of the wheel assembly and receivable within the slots 62 in the tubular member 24. These lugs or ears provide keys to prevent rotation of the clamping members 72, 74 relative to the tubular member 24. As the tubular member 24 is threaded inwardly of the hub 44 the bead of the diaphragm 68 will be firmly, clampingly engaged between the clamps 72 and 74.

The central portion of the diaphragm 68 is, as noted above, anchored relative to the tubular member 22. More specifically, a circular disc-like back-up member or piston 80 is disposed concentrically of and interiorly of the diaphragm and serves to clamp the central portion of the diaphragm between the piston 80 and a circular disc 82 received within a recess in the hub 66 and integral keys 64. A bolt 84 and nut 86 maintain the piston, diaphragm and hub 66 in assembly, whereby movement of the piston 80 in a direction axially and outwardly of the sleeve 24 will cause movement of the tubular member 22, and thus the rim member 10 in a corresponding direction so as to reduce the spacing of the rim members 10 and 12.

Conduit means 88 are provided which communicate at one end with the interior or the diaphragm 68 and at the other end exteriorly of the wheel assembly. The conduit means comprises a flexible pipe or tube 90 of a length sufficient to accommodate the travel of the sleeve 22. The tube 90 is connected at one end to a fitting 92 which is mounted on the central portion of the diaphragm and extends through the plate 82 and hub 66. An opening 94 through the piston 80 which is aligned with the fitting 92 provides for communication between the interior of the fitting 92 and the interior of the diaphragm 68. The tube 90 is connected at its other end to a fitting 96 which extends through and is fixed relative to the end wall 26 of the tubular member 24. The fitting 96 extends outwardly beyond the end wall 26 and is provided with valve means internally thereof for controlling the flow of pressurized air into and out of the tube 90 and thus into and out of the interior of the diaphragm 68. More particularly, a more or less conventional tire valve may be used for this purpose.

In the operation of the embodiments of FIGS. 1 to 3, the vehicle normally will be supported by the tire 23 with the tire in the solid line position shown in FIG. 1. In other words, sufficient air pressure will be provided within the diaphragm 68 to provide that the tubular members 22, 24 will be telescoped together to the limit permitted, whereby the beads 18 and 20 of the tire will be spaced at the minimum distance permitted by the assembly. When it is desired to provide greater flotation, the air pressure is released from within the expansible chamber formed by the diaphragm 68 whereupon the pressure within the tire 23 will tend to move the beads apart and move the rim member 10 away from the rim member 12. This relative movement of the rim members might be assisted by rolling the vehicle a short distance. The outer tubular member 22 and thus the rim member 10 will move to the right, as viewed in FIG. 1, in a direction corresponding to separation of the rim members 10 and 12 until the tubular member 22 engages the outer end of the hub 44. The tire will then have a cross-section, as shown in broken line in FIG. 1. It will be observed from FIG. 1 that in both positions of the tire beads, the tire has a generally toroidal shape. It will further be observed that when the tire 23 is in the solid line position of FIG. 1 the section height (SH) and section width (SW) of the tire is substantially greater and smaller, respectively, than when the tire is in the broken line position of FIG. 1 wherein the beads of the tire are spaced apart the maximum distance permitted by the axial expandable wheel assembly. As is conventional, and as clearly shown in FIG. 1, the section height of the tire is measured at the circumferential centerline of the tire and the section width of the tire is measured at the point of maximum width of the tire.

The tire 23 is generally conventional in construction except that it is molded to a cross-sectional shape substantially that shown in broken line in FIG. 1. In other words, when the tire is unmounted and uninflated, the beads thereof will be spaced apart a distance at least substantially equal to, and preferably greater than, the maximum spacing of the beads permitted by the wheel assembly. This will tend to assure that there will be no tendency for the beads to become unseated when the shape of the tire is changed from that shown in solid line to that shown in broken line in FIG. 1. However, it may be desirable to provide additional means for assuring that the beads remain seated on the rim members.

When the need for additional flotation no longer exists, pressurized air is introduced through the conduit means 88 into the interior of the diaphragm 68 to move the central portion of the diaphragm from the broken line position shown in FIG. 1 to the solid line position shown, thereby effecting relative movement between the rim members 10 and 12 toward each other and into the solid line position, as shown in FIG. 1. The tire 23 will at the same time assume the solid line shape shown in FIG. 1.

Figure 4:
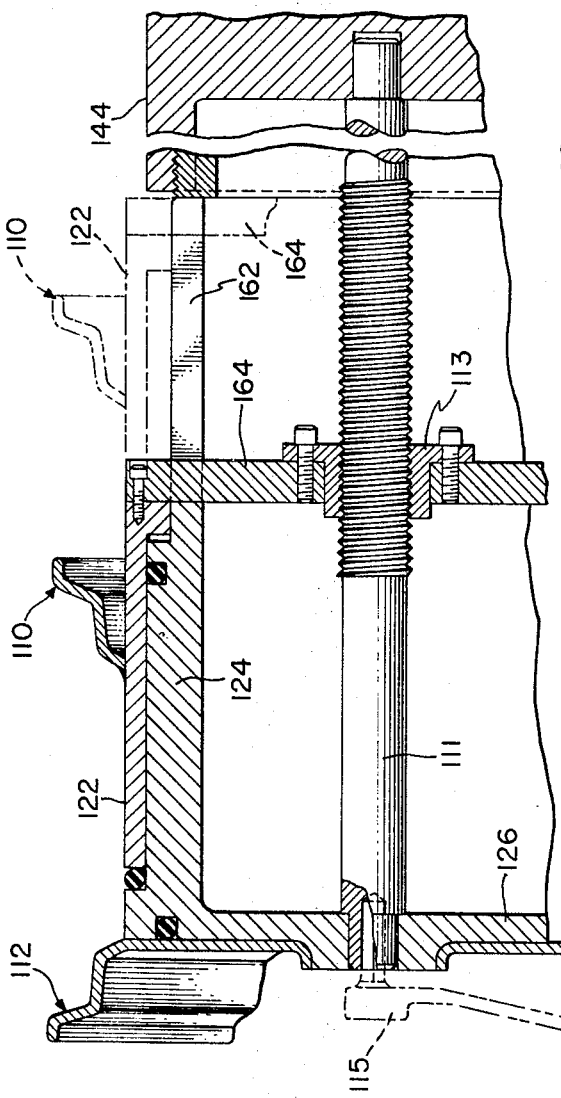
FIG. 4 is a fragmentary, longitudinal cross-sectional view of an alternative construction of a wheel assembly according to the present invention.

With reference to FIG. 4 there is shown an alternative embodiment of the present invention. In this embodiment the axially expandable wheel assembly comprises a pair of telescopically and coaxially arranged tubular members 122 and 124 constructed and arranged similarly to the tubular members 22 and 24 previously described. The tubular members 122 and 124 are non-rotatably connected for telescoping relative axial movement therebetween by a plurality of keys, or the like, 164 extending radially inwardly from the outer tubular member 122 through slots 162 extending longitudinally of the inner tubular member 124. The inner end of the inner tubular member 124 is threadably mounted on a hub 144, similarly to the hub 44 previously described. The hub 144 is suitably supported for rotation relative to a vehicle on which it is supported, such as in the same manner as the hub 44 of the previously described embodiment. A pair of rim members 110, 112, similar to the rim members 10 and 12 previously described, are supported respectively on, and for movement with, the tubular members 122, 124. The rim members are adapted to support a tire such as the tire 23, previously described.

In brief, the wheel assembly of FIG. 4 is essentially the same as the wheel assembly shown and described in connection with FIG. 1 except that the means for effecting relative movement between the rim member 110, 112 is different. More specifically, an elongated jack screw 111 is rotatably supported at one end on the end wall 126 of the inner tubular member 124 and extends coaxially of the tubular member 124. The inner end of the jack screw 111 is journaled in the hub 144. The inner ends of the keys 164 are mounted on an internally threaded member or nut which is threadedly engaged over the jack screw 111. The outer end of the jack screw 111 communicates exteriorly of the wheel assembly and is provided with a tool engageable opening within which is drivingly engageable a tool such as a crank 115. Upon manual rotation of the crank 115, the jack screw 111 will be rotated relative to the nut 113 to effect relative axial movement between the rim members 110, 112. More particularly, when the crank is rotated in one direction the rim member 110 will be moved away from the rim member 112, and upon cranking of the jack screw 111 in the opposite direction the rim member 110 will be moved toward the rim member 112. The limits of movement of the rim members is determined by stop means in the same manner as described in connection with the embodiment of FIG. 1. The operation of the wheel assembly of FIG. 4, together with a tire as shown in FIG. 1, is the same as described in connection with the first described embodiment herein except that the drive means of the embodiment of FIG. 1 is operative to effect relative movement between the rim members in one direction only which direction corresponds to a reduction in the spacing of the rim members.

While certain representative embodiments and details have been shown for the purpose of illustrating the invention, it will be apparent to those skilled in this art that various changes and modifications may be made therein without departing from the invention.

What is claimed is:

1. A tire and wheel assembly for a vehicle comprising: a pair of coaxially disposed and axially spaced rim members: a pneumatic tire having a pair of spaced beads respectively seated on said pair of rim members, said tire operable in supporting relation to the rim members in a first and second position; means mounting said rim members for coaxial relative movement therebetween; and drive means for effecting relative axial movement between said pair of rim members to effect corresponding relative axial movement between said pair of beads to move said tire between the first and second operating positions thereof; said tire, when mounted on said rim members and inflated, having a generally toroidal shape in both said first and second operating positions and a section height (SH) and section width (SW) which decrease and increase, respectively, as the spacing between the rim members increases.

2. In a tire and wheel assembly as claimed in claim 1, the beads of said tire when uninflated and unmounted being axially spaced apart a distance at least equal to the axial spacing of the beads when the beads are in farthest spaced relation.

3. In combination with a vehicle having an axle, at least one wheel assembly carried by said axle, each said wheel assembly carried by said axle comprising a pair of coaxially disposed and axially spaced rim members adapted to mount respectively a pair of beads of a tire, means mounting each said pair of rim members for coaxial relative movement therebetween in both directions corresponding to an increase and a decrease in axial spacing of said rim members and at least substantially fixing said rim members relative to each other with respect to movement about the common axis thereof, and drive means for effecting relative axial movement between the rim members of each said pair thereof to move a tire mounted in inflated relation on the rim members between two operable positions where the tire is in supporting relation to the rim members and the section height (SH) and section width (SW) of the tire decreases and increases, respectively, as the spacing between the rim members increases.

4. In the combination as claimed in claim 1, 2 or 3, said means mounting each of said pair of rim members including a pair of telescopically and coaxially arranged tubular members respectively supporting said pair of rim members for movement therewith, said drive means acting between said pair of tubular members.

5. In the combination claimed in claim 1, 2 or 3, said means mounting each of said pair of rim members including a pair of telescopically and coaxially arranged tubular members respectively supporting said pair of rim members for movement therewith, said drive means acting between said pair of tubular members, and an axially displaceable driving connection between said tubular members to provide for rotation of said tubular members as a unit and permit relative axial movement therebetween.

6. In the combination claimed in claim 1, 2 or 3, said means mounting each of said pair of rim members including a pair of telescopically and coaxially arranged tubular members respectively supporting said pair of rim members, said drive means acting between said pair of tubular members, one of said tubular members providing support for the other of said tubular members, and sealing means between said tubular members to prevent passage of air therebetween.

7. In the combination claimed in claim 1, 2 or 3, said means mounting each of said pair of rim members including a pair of telescopically and coaxially arranged tubular members respectively supporting said pair of rim members, said drive means acting between said pair of tubular members, an axially displaceable driving connection between said tubular members to provide for rotation of said tubular members as a unit and permit relative axial movement therebetween, and stop means for limiting relative axial movement between said tubular members in both directions corresponding to movement of said rim members toward and away from each other.

8. In the combination claimed in claim 1, 2 or 3, said drive means including an expansible chamber acting between said rim members, and conduit means communicating at one end with the interior of said expansible chamber and at the other end exteriorly of said assembly, said conduit means including valve means for controlling the flow of pressurized fluid into and out of said expansible chamber.

9. In the combination claimed in claim 1, 2 or 3, said drive means comprising a pair of drivingly interengageable members, one of said pair of members being movable relative to the other member of said pair to effect relative movement between said pair of members in a direction corresponding to the relative axial movement between said rim members.

10. In the combination claimed in claim 1, 2, or 3, said drive means comprising a first threaded member fixed axially relative to one of said rim members and a second threaded member threadably engaged with said first threaded member and fixed with respect to axial movement relative to the other of said pair of rim members, and means to rotate one of said threaded members to effect axial movement of the other threaded member and thus vary the axial spacing of said rim members.

References Cited
UNITED STATES PATENTS

| | | | |
|---|---|---|---|
| 2,124,345 | 7/1938 | Grange | 152—411 X |
| 2,242,915 | 5/1941 | Koski | 152—7 |
| 2,751,959 | 6/1956 | Blomquist | 152—352 |
| 2,998,996 | 9/1961 | Aghnides | 152—352 |
| 3,107,643 | 10/1963 | Edwards | 301—5 |

ARTHUR L. LA POINT, Primary Examiner

C. B. LYON, Assistant Examiner